Figure 1:
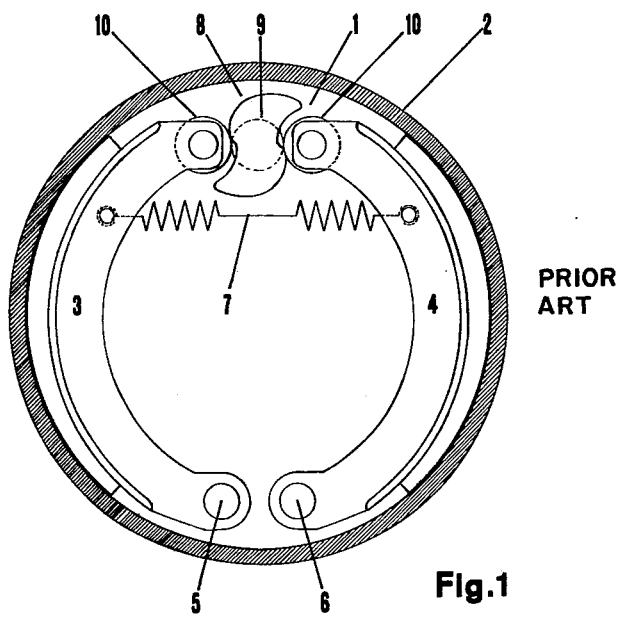

United States Patent [19]

Camph et al.

[11] 4,180,898
[45] Jan. 1, 1980

[54] METHOD OF REPLACING BRAKE FORCE TRANSMISSION PARTS IN VEHICLE WHEEL BRAKES

[75] Inventors: Sven E. Camph, Malmo; Bertil K. A. Holmgren, Trelleborg, both of Sweden

[73] Assignee: Camph Engineering Company AB, Malmo, Sweden

[21] Appl. No.: 918,388

[22] Filed: Jun. 23, 1978

[30] Foreign Application Priority Data

Jul. 15, 1977 [SE] Sweden ................. 7708220

[51] Int. Cl.² .................. B23P 7/00; B23P 15/18
[52] U.S. Cl. .................. 29/402.07; 188/79.5 GE; 29/402.13
[58] Field of Search ............. 29/401 R, 401 B, 401 D, 29/401 F; 188/196 B, 196 BA, 79.5 K, 79.5 GE, 79.5 GC, 79.5 GT, 79.5 P, 79.5 K

[56] References Cited

U.S. PATENT DOCUMENTS

| | | | |
|---|---|---|---|
| 3,464,525 | 9/1969 | Newstead | 188/79.5 K |
| 3,891,068 | 6/1975 | Camph | 188/79.5 GE |

Primary Examiner—Francis S. Husar
Assistant Examiner—V. K. Rising
Attorney, Agent, or Firm—Wilkinson, Mawhinney & Theibault

[57] ABSTRACT

In a key-activated vehicle wheel drum brake -e.g. a so-called S-cam-brake - means for automatically compensating the wear on the brake lining may be inserted between the key and the brake shoe ends by a method involving the steps of removing the original key as well as a predetermined part of the original brake shoe ends. A new key, new brake shoe ends and new automatic compensation means are subsequently added.

1 Claim, 5 Drawing Figures

METHOD OF REPLACING BRAKE FORCE TRANSMISSION PARTS IN VEHICLE WHEEL BRAKES

This invention relates to a method of replacing brake force transmission parts in vehicle wheel brakes of the type in which an S-cam key mounted on a rotatable key shaft journalled in a backing plate is adapted to move a pair of brake shoes against an inner cylindrical surface of a brake drum with transmission parts wherein the brake force between the key and the ends of the brake shoes is performed by a pair of new compression force transmitting members having self-adjustable length.

Recently new types of automatic slack adjusters have been developed for maintaining a constant gap between the braking surfaces of vehicle wheel brakes when in released brake position. The advantages obtained are often of such magnitude that it is economical to replace the brakes originally equipped at a rather new vehicle by brakes having automatic slack adjusters. It is, however, desirable to develop a method by which an ordinary skilled fitter can replace the relevant parts of the brake without taking the vehicle to a garage having special equipment for servicing and testing brakes. The object of the present invention is to provide such method and this is according to the present invention characterised by the following steps: the compression force transmitting members, the key shaft with the key and the brake shoes are removed, the key is cut off from the key shaft, the brake shoes are held in a fixture in predetermined relative positions, the ends of the brake shoes to be contacted by the compression force transmitting members are cut off according to a predetermined template and substituted by new ends secured by welding and that a new key is welded to the key shaft prior to refitting of the key shaft and the brake shoes in the backing plate and fitting new compression force transmitting members between the key and the ends of the brake shoes.

The invention will be described in more detail reference being made to the drawing in which FIGS. 1-5 schematically shows the steps of a method according to the invention.

FIG. 1 shows schematically a conventional S-cam drum brake comprising a backing plate 1 which is stationary relative the chassis of the vehicle and a drum 2 which is rigidly connected to a wheel of the vehicle. A pair of brake shoes 3, 4 are connected to the backing plate 1 by pivots 5, 6. The two brake shoes are forced towards each other by a tension spring 7. A key 8 shaped as an S-cam is mounted on a shaft 9 journalled in the backing plate 1. Said key 8 engages a pair of rollers 10, journalled at the ends of the brake shoes remote from the pivots 5, 6.

In case the shaft 9 is turned counter-clockwise the rollers 10, and thus the brake shoes 3, 4 are forced away from each other until the brake shoes contact the inner surface of the drum 2 to perform a braking of the wheel.

In case the brake force transmitting means of the brake shown in FIG. 1 should be replaced by means allowing automatic adjustment to compensate for wear of the braking surfaces the following steps may be performed.

Figure 2:
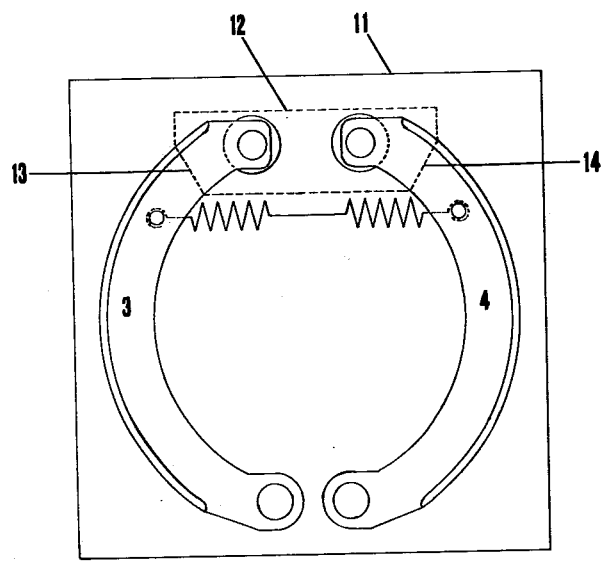

FIG. 2 shows a fixture 11 in which the brake shoes 3, 4 are held in the relative positions prevailing during fully released brake.

Figure 3:
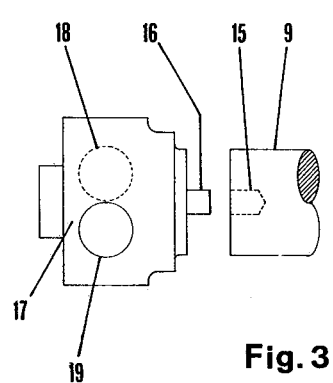
Figure 4:
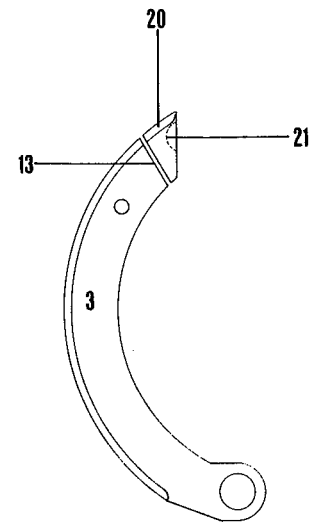

A template 12 shown in dotted lines is placed to cover the upper part of the brake shoes 3. The overlapping limits—shown as the lines 13 and 14 are now marked on the brake shoes 3, 4. The template 12 is now removed and the ends of the brake shoes 3, 4 previously covered by the template 12 are cut off. The key 8 is cut off from the shaft 9, which is provided with an end bore 15—shown in FIG. 3—enabling the introduction of a guide pin 16 of a replacement key 17—also shown in FIG. 3. The key 17 may now be united with the shaft 9 by welding. As shown in FIG. 3 the key 17 is provided with cavities 18 and 19 for receiving special force transmitting elements—not shown. A replacement shoe part 20—shown in FIG. 4 and having a special cavity 21 for receiving a force transmission element—may now be added by welding.

Alternatively the cutting off of the brake shoe ends and the welding of the replacement shoe parts may be performed while the brake shoe is still located in the fixture 11.

Figure 5:
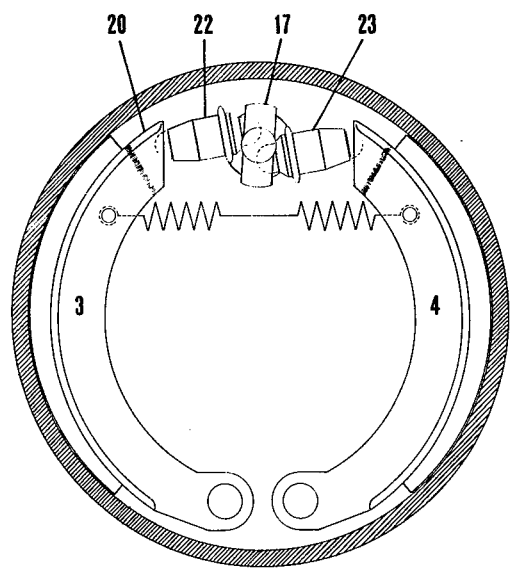

FIG. 5 shows the brake after fitting of the brake shoes 3, 4 with the renewed upper brake shoe ends. Also the new key 17 is shown engaging the new force transmitting elements 22,23 enabling performing of automatic slack adjustment. The function of said elements will not be described and does not form any part of the present invention. They may be of the type described in U.S. Pat. No. 4,161,999 issued July 24, 1979, from U.S. Ser. No 859,735 filed Dec. 12, 1977.

Each vehicle comprises two symmetrically designed types of brakes. One type for the left hand side and the other for the right hand side of the vehicle. Thus it will be necessary to use two fixtures and two sets of replacement parts for each vehicle. The replacement parts may advantageously be manufactured by precision casting.

We claim:

1. The method of replacing brake force transmission parts in vehicle wheel brakes of the type in which a key mounted on a rotatable key shaft journalled in a backing plate is adapted to move a pair of brake shoes towards an inner cylindrical surface of a brake drum with transmission parts wherein the brake force between the key and the ends of the brake shoes being performed by a pair of new compression force transmitting members having self-adjusting length, comprising the steps of,
   (a) removing the compression force transmitting members, the key shaft with the key and the brake shoes,
   (b) cutting the key off from the key shaft,
   (c) holding the brake shoes in a fixture in predetermined relative positions,
   (d) cutting off the ends of the brake shoes according to a predetermined template,
   (e) substituting new ends,
   (f) securing by welding the substituted ends,
   (g) welding a new key to the key shaft prior to the next step,
   (h) refitting the key shaft and the brake shoes in the backing plate, and
   (i) fitting new compression force transmitting members between the new key and the substituted ends of the brake shoes.

* * * * *